United States Patent [19]

Ota et al.

[11] Patent Number: 5,504,735
[45] Date of Patent: Apr. 2, 1996

[54] INFORMATION RECORDING DISK HAVING A STEPPED CENTRAL RECESS AND HUB CONFIGURATION

[75] Inventors: Tsutomu Ota; Mamoru Sugimoto; Yasuto Nose; Hidetoshi Yoshitaki; Tatsuro Higashi; Takashi Hayashi, all of Nagano, Japan

[73] Assignee: Seiko Epson Corporation, Tokyo, Japan

[21] Appl. No.: 163,604

[22] Filed: Dec. 6, 1993

Related U.S. Application Data

[63] Continuation of Ser. No. 907,907, Jul. 2, 1992, abandoned, which is a continuation of Ser. No. 262,371, Oct. 25, 1988, Pat. No. 5,265,086.

[30] Foreign Application Priority Data

Oct. 27, 1987 [JP] Japan .................. 62-270742
Oct. 29, 1987 [JP] Japan .................. 62-274106
Nov. 26, 1987 [JP] Japan .................. 62-298186
Jun. 27, 1988 [JP] Japan .................. 63-158806

[51] Int. Cl.⁶ ............................................. G11B 3/70
[52] U.S. Cl. ........................................ 369/282; 360/135
[58] Field of Search ..................... 369/271, 280, 369/290, 272, 282, 284, 283, 289, 292, 285, 287; 360/131, 133, 135

[56] References Cited

U.S. PATENT DOCUMENTS

| | | | |
|---|---|---|---|
| 4,641,152 | 2/1987 | Fedder et al. | 369/280 |
| 4,710,913 | 12/1987 | Matsushima et al. | 369/282 |
| 4,785,444 | 11/1988 | Nakama et al. | 369/290 |
| 4,827,468 | 5/1989 | Odawara et al. | 369/271 |
| 4,827,470 | 5/1989 | Odawara et al. | 369/290 |
| 4,839,208 | 6/1989 | Nakagawa et al. | 369/288 |
| 5,265,086 | 11/1993 | Ota et al. | 369/284 |

FOREIGN PATENT DOCUMENTS

| | | |
|---|---|---|
| 227981 | 7/1987 | European Pat. Off. . |
| 233644 | 8/1987 | European Pat. Off. . |
| 230963 | 8/1987 | European Pat. Off. . |
| 266746 | 5/1988 | European Pat. Off. . |
| 2624375 | 12/1977 | Germany . |
| 0156547 | 7/1986 | Japan .................. 369/280 |
| 63-81667 | 4/1988 | Japan . |
| 63-129578 | 6/1988 | Japan . |

Primary Examiner—Stuart S. Levy
Assistant Examiner—Brian E. Miller
Attorney, Agent, or Firm—Stroock & Stroock & Lavan

[57] ABSTRACT

An information recording disk formed from two substrates with a stepped central opening for receiving a hub within the stepped recess of at least one of the substrates is provided. In one embodiment, the central aperture of the first substrate is larger than the central aperture of the second substrate to form the stepped recess. In another embodiment, at least one substrate has a stepped surface defining a central aperture and a hub structure is mounted within this stepped recess to reduce overall thickness of the disk.

26 Claims, 4 Drawing Sheets

INFORMATION RECORDING DISK HAVING A STEPPED CENTRAL RECESS AND HUB CONFIGURATION

This is a continuation of application Ser. No. 07/907,907 filed Jul. 2, 1992, now abandoned which is a continuation of Ser. No. 07/262,371 filed Oct. 25, 1988 now U.S. Pat. No. 5,265,086 for INFORMATION RECORDING DISK.

BACKGROUND OF THE INVENTION

The invention relates generally to an information recording disk, and more particularly to a recording disk which can be used as a magneto-optical recording medium.

The specification for conventional information recording disks are detailed in ISO/TC97/SC23 Document No. 126, item 4.9. As shown in FIG. 10 an information recording disk 101 constructed according to this publication includes a hub 104 mounted on a first substrate 11 over a center aperture 102 of disk 101. Alternatively, a hub can be mounted on both a second substrate 12 and first substrate 11. In either embodiment, the hub is bonded to the surface of a substrate which includes an information recording layer by an adhesive or ultrasonic welding.

Conventional methods for mounting a hub on an information recording disk substrate such as bonding or ultrasonic welding adversely affect the quality of the information recording disk by increasing the birefringence of the substrate. Data in FIG. 12 illustrates how the birefringence of the substrate is affected by welding a hub to the substrate in a conventional arrangement. The double path variation in birefringence was measured using a 633 nm He—Ne parallel beam laser After a hub was ultrasonically welded to a polycarbonate substrate, the birefringence of the substrate increased by about 40 nm at a radius of about 23 mm. Such an increase in birefringence can adversely affect the quality of an information recording disk such as by degrading the signal qualities and leading to unstable operation of servomechanisms.

Conventional arrangements for mounting hubs onto recording disk substrates have other shortcomings as shown in FIG. 11. A disk 110 having a hub 111 mounted over a center aperture 114 is mounted on a spindle 112. When disk 110 which hub 111 is mounted in a drive, it is necessary that disk 110 be kept away from contacting spindle 112 and other guide members. Accordingly, it is necessary that components be designed so that the height of hub 111 does not raise such a problem. A conventional hub typically has a thickness of between about 2 to 3 mm. This does not usually present a problem when the drive is designed to accommodate such dimensions However, when it is required to reduce the thickness of the drive and the disk, the thickness of the hub becomes a serious factor. Accordingly, if two disk substrates each having a thickness of 1.2 mm are bonded together this presents a total thickness of 2.4 to 2.5 mm, and if a hub having a thickness of 2.2 mm is bonded to the substrates, the overall thickness is 4.6 to 4.7 mm, which is considered to be too large.

Additional problems are presented by the conventional hub mounting arrangements of FIG. 11 during operation. When disk 101 is placed in a drive and is rotated by spindle 112 of a drive motor, considerable heat from the drive motor is transmitted through hub 111 to substrate 115. As a result, the disk becomes distorted by the heat leading to changes in optical birefringence and mechanical properties. The extent to which various portions of the disk are influenced by the heat depends on the distance from the hub. The closer the arrangements, the greater the influence. Therefore, if the diameter of hub 111 is large the outer edge of hub 111 will be in close proximity to a recording layer 113 of disk 110 and the influence cannot be overlooked. Accordingly, this hub mounting arrangement detracts from the quality of the information recording disk by heating information recording layer 113 unevenly.

Accordingly, it is desireable to provide an information recording disk having an improved hub mounting arrangement which allows the disk to be thinner than conventional recording disks and does not suffer from other shortcomings of the prior art.

SUMMARY OF THE INVENTION

Generally speaking, in accordance with the invention, an information recording disk having an improved hub mounting arrangement is provided. The recording disk includes two substrate layers having aligned central mounting apertures. The diameter of the aperture of the first substrate layer is larger than the diameter of the inner aperture of the second substrate layer to form a central stepped recess. A hub is mounted in the stepped recess formed by the difference in the diameters of the two apertures to provide a disk of reduced thickness.

Accordingly, it is an object of the invention to provide an improved information recording disk.

Another object of the invention is to provide an improved information recording disk of reduced thickness.

A further object of the invention is to provide an improved recording disk which does not have a projecting hub.

Still another object of the invention is to provide an improved disk not subject to distortion caused by heat.

Yet another object of the invention is to provide information recording disks which can be used with smaller, more compact disk drives Still other objects and advantages of the invention will in part be obvious and will in part be apparent from the specification and drawings.

The invention accordingly comprises an article of manufacture possessing the features, properties, and the relation of elements which will be exemplified in the articles hereinafter described, and the scope of the invention will be indicated in the claims.

BRIEF DESCRIPTION OF THE DRAWINGS

For a fuller understanding of the invention, references is had to the following description taken in connection with the accompanying drawings, in which.

DESCRIPTION OF THE PREFERRED EMBODIMENTS

Figure 1:
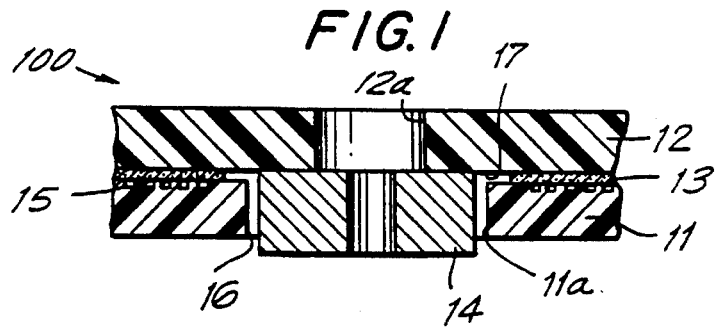
FIG. 1 is a sectional view of an information recording disk constructed in accordance with a first embodiment of the invention.

FIG. 1 is a sectional view of an information recording disk 100 constructed in accordance with a first embodiment of the invention. Disk 100 is formed from a first disk substrate 11 having a central aperture 11a bonded to a second disk substrate 12 having a central aperture 12a by an adhesive 13. A series of guide grooves 15 are formed on the interior surface of first substrate 11 about central aperture 11a. The center position for attaching a hub 14 is determined by locating the position of guide grooves 15 with a sensing device after substrate 12 is bonded to substrate 11. Hub 14 is then attached to substrate 12 by a suitable method, such as ultrasonic welding, or an adhesive.

The diameter of inner aperture 11a of first substrate 11 is larger than the outer diameter of hub 14 so that hub 14 does not contact substrate 11 and only contacts second substrate 12. Appropriate dimensions for disk 100 are an inner aperture 11a of substrate 11 having an inner diameter of φ15 mm and an inner aperture 12a of substrate 12 having a diameter of φ10 mm. Hub 14 has a diameter of φ14 mm and a thickness of 2.2 mm. An information recording disk so constructed will have an overall thickness of about 3.4 to 3.5 mm, assuming that substrate 11 and substrate 12 each have a thickness of about 1.2 mm. The overall thickness of disk 100 is only about 1 mm thicker than the combined thickness of the two substrates.

The information recording layer of disk 100 is present only in first substrate 11 so that, information recording and reading of disk 100 are not detrimentally altered when hub 14 is mounted on the disk. Because hub 14 only contacts substrate 12, only substrate 12 is mechanically or thermally affected. Accordingly, an information recording disk constructed in this manner does not suffer from the effects of prior art hub mounting configurations.

Figure 2:
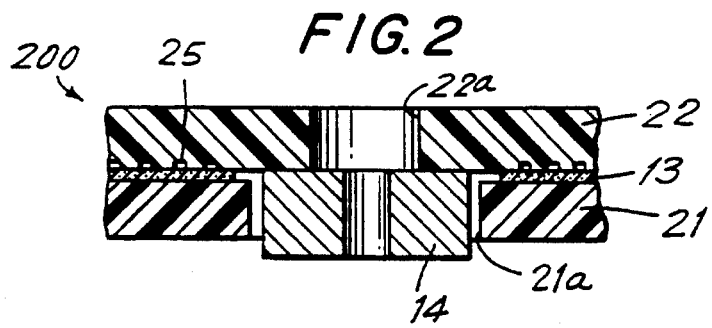
FIG. 2 is a sectional view of an information recording disk constructed in accordance with a second embodiment of the invention.

FIG. 2 is a sectional view of an information recording disk 200 constructed in accordance with a second embodiment of the invention. In this embodiment, a second substrate 22 formed with a central aperture 22a and having a set of guide grooves 25 and an information recording layer such as an optical recording layer is bonded to a first substrate 21 formed with a central aperture 21a by a suitable adhesive 13. First substrate 21 is formed without an information recording layer.

This embodiment differs from the first embodiment in that hub 14 is fixed to substrate 22 which includes the information recording layer. After substrate 21 is bonded to substrate 22 by adhesive, guide grooves 25 are sensed to locate the center of grooves 25 and properly position hub 14. Hub 14 is then fixed to substrate 22 by a suitable method such as ultrasonic welding or with an adhesive. Aperture 21a of first substrate 21 has a diameter of φ15 mm and aperture 22a of second substrate 22 has a diameter of φ10 mm. Hub 14 has a diameter of φ14 mm and a thickness of 2.2 mm. If the thickness of substrate 21 and substrate 22 are each about 1.2 mm, the overall thickness of the disk will be between about 3.4 to 3.5 mm which is significantly thinner than conventionally formed disk substrates.

Hub 14 of information recording disk 200 is fixed to substrate 22 which includes the information recording layer. However, this does not cause the disk to be unsuitable. Reading and recording of information occurs through substrate 21 which is not affected when hub 14 is bonded to second substrate 22. Accordingly, any distortion in substrate 22 caused by mounting hub 14 has a minimal effect on the information recording and reading qualities of disk 200.

Figure 3:
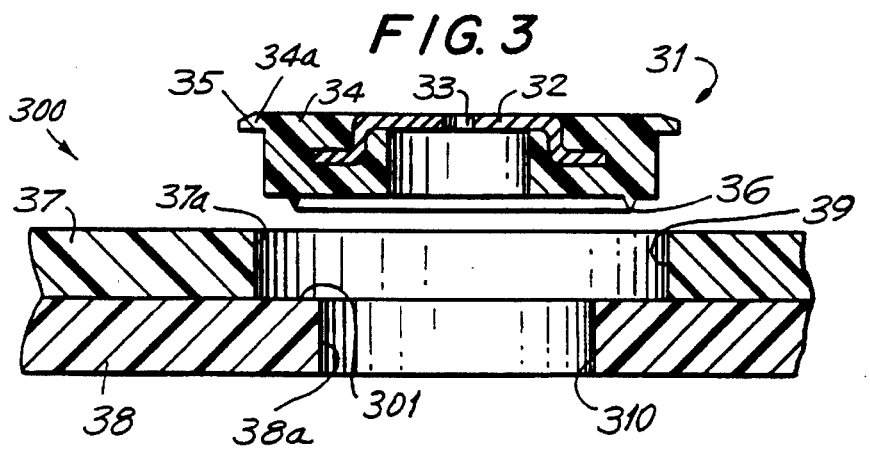
FIG. 3 is a partial sectional view of a disk hub in position prior to ultrasonic welding to the substrates.
Figure 4:
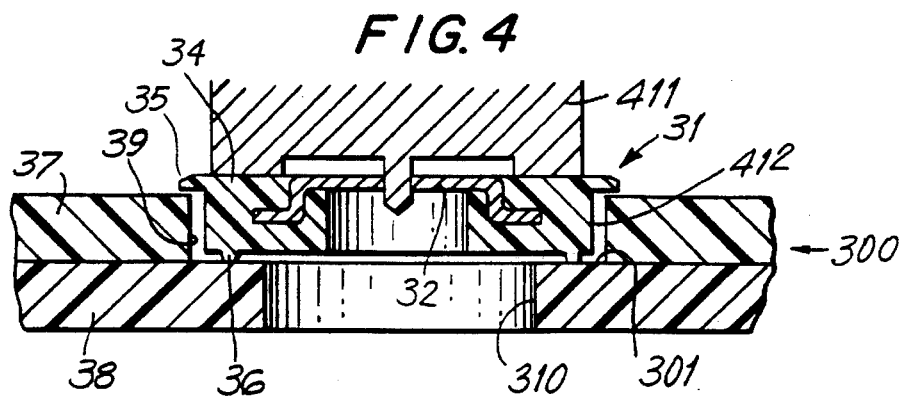
FIG. 4 is a sectional view of the hub and recording disk of FIG. 3 after welding.
Figure 5:
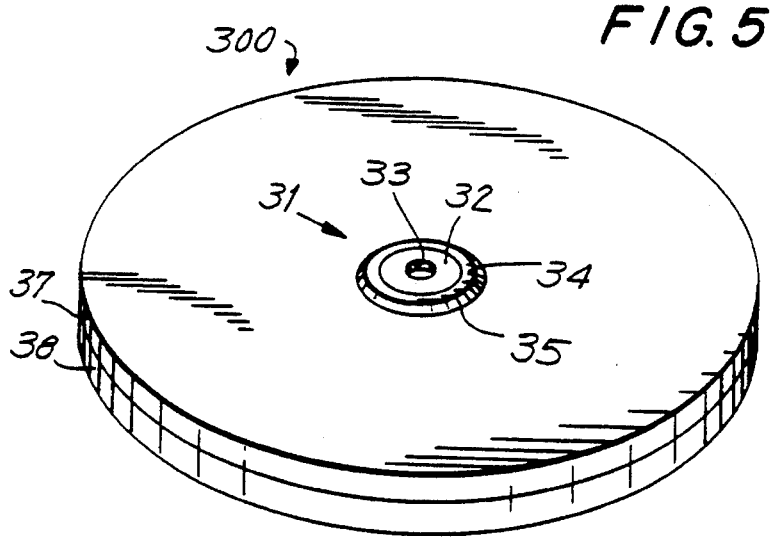
FIG. 5 is a perspective view of an information recording disk constructed in accordance with a third embodiment of the invention.

An information recording disk 300 constructed in accordance with a third embodiment of the invention is shown in FIG. 3, FIG. 4 and FIG. 5. A first substrate 37 having a central aperture 37a with a large diameter is bonded to a second substrate 38 having a central aperture 38a with a smaller diameter to define a stepped central recess surface having a shoulder 301. Aperture 37a defines a first vertical wall 39 and aperture 38a defines a second vertical wall 310. A hub 31 is inserted within aperture 37a and is welded to shoulder 301.

Hub 31 of information recording disk 300 is formed of a hub metal plate 32 mounted on a hub plate 34. Hub metal plate 32 contacts a disk drive spindle when information recording disk 300 is mounted in a disk drive and is formed of a magnetic material having a Vickers hardness (Hv) of more than about 200. Suitable materials for hub metal plate 32 include rust treated iron based materials, nickel or chromium plated iron based materials and magnetic stainless steels, such as SUS420J2 which can be subjected to hardening treatment.

The preferred Vickers hardness value of more than about 200 was determined experimentally. An information recording disk including hub 31 was formed with hub metal plate 32 formed of an SUS material having a Vickers hardness (Hv) of less than about 200. This disk was repeatedly mounted and dismounted from an experimental testing apparatus. A central spindle hole 33 of hub metal plate 32 was deformed by this activity. The deformed spindle hole 33 rendered the information recording disk unusable. However, when an SUS420J2 steel which had been heat treated was used, deformation did not occur even after the information recording disk was mounted and dismounted from an experimental apparatus about 100,000 times.

Hub 31 also includes a hub plate 34 having an outwardly projecting peripheral flange 34a. Hub plate 34 should be formed of the same material that forms disk substrates 37 and substrate 38. This will increase the adherence of hub 31 to a disk substrate. For example, if substrate 37 and substrate 38 are formed of polycarbonate, hub plate 34 should also be formed of polycarbonate. Flange 34a of hub plate 34 includes a declining beveled or chamfered surface 35. Declining surface 35 aids in the smooth mounting and dismounting of information recording disk 300 from a disk drive so that disk 300 does not catch on the disk drive guide portions.

Hub plate 34 is also formed with a welding portion 36 on its bottom surface to weld hub 31 to shoulder 301 of the stepped recess. Welding portion 36 is a ring having a "V" shaped cross section, formed on the bottom surface of hub plate 34. Welding portion 36 extends about 0.3 to 0.4 mm from the bottom surface of hub plate 34. The angle of the apex of welding portion 36 can be about 45° to 60°.

Hub metal plate 32 must be securely mounted on hub plate 34. Hub metal plate 32 can be heat caulked or bonded to hub plate 34 with adhesive. However, hub metal plate 32 should preferably be integrated within hub plate 34 by insertion forming.

Hub 31 is ultrasonically welded to substrate 38 as shown in FIG. 4 in the following manner. Hub 31 is placed in the stepped central recess formed by the aligned central apertures of substrate 37 and substrate 38 against shoulder 301 of substrate 38. Hub 31, substrate 37 and substrate 38 are vibrated by an ultrasonic welding machine such as VMP-728PR of Cho-Ompa Kogyo K. K. by an ultrasonic horn 411. Friction induced heat generated by hub 31 and substrate 38 softens welding portion 36 formed of resin to weld these two pieces together after about 0.1 to 0.3 seconds of vibrating.

The desired configuration of hub metal plate 32 is affected by the welding process. Hub metal plate 32 can be bent so that it does not contact ultrasonic horn 411 directly during ultrasonic welding. However, it is in direct contact with hub plate 34 which is formed of resin. This enables the absorption of the impact from sound vibration generated by horn 411 during ultrasonic welding. A configuration in which hub metal plate 32 is not bent and contacts ultrasonic horn 411 during ultrasonic welding may alternately be adopted. This is acceptable because welding occurs between about 0.1 and 0.3 seconds.

Information recording disks constructed in accordance with this embodiment were evaluated Disks including hub 31 including welded portion 36 extending about 0.1 to 0.2 mm after ultrasonic welding were formed. Outer wall 412 of hub 31 had a diameter between φ14.0 to 14.8 mm, and vertical wall 39 of first substrate aperture 37a had a diameter of φ15.0 mm. Aperture 38a of second substrate 38 had a diameter fixed between φ10 to 12 mm at vertical wall 310.

After fixing hub 31, the peel strength was measured and found to be at least 5 kg. This level of strength is considered sufficient to secure hub 31 to information recording disk 300 during mounting, dismounting and high speed rotation.

Similar results can be achieved while modifying the hub mounting configuration described above. For example, all the diameters can be enlarged so that the diameter of the aperture of the second substrate 38 is increased to φ15 mm, the conventional substrate inner diameter, and the diameter of aperture 37a of substrate 37 and the diameter of hub 31 are likewise increased while maintaining the same stepped recess configuration. Further, guide grooves can be formed in either substrate 37 or substrate 38 without affecting the peeling strength of the mounted hub. In fact, the same results are obtained if the information recording disk is a double surface information recording disk in which grooves are formed on both substrates. However, the welding region should be located away from the recording layer of the information recording disk.

Figure 12:
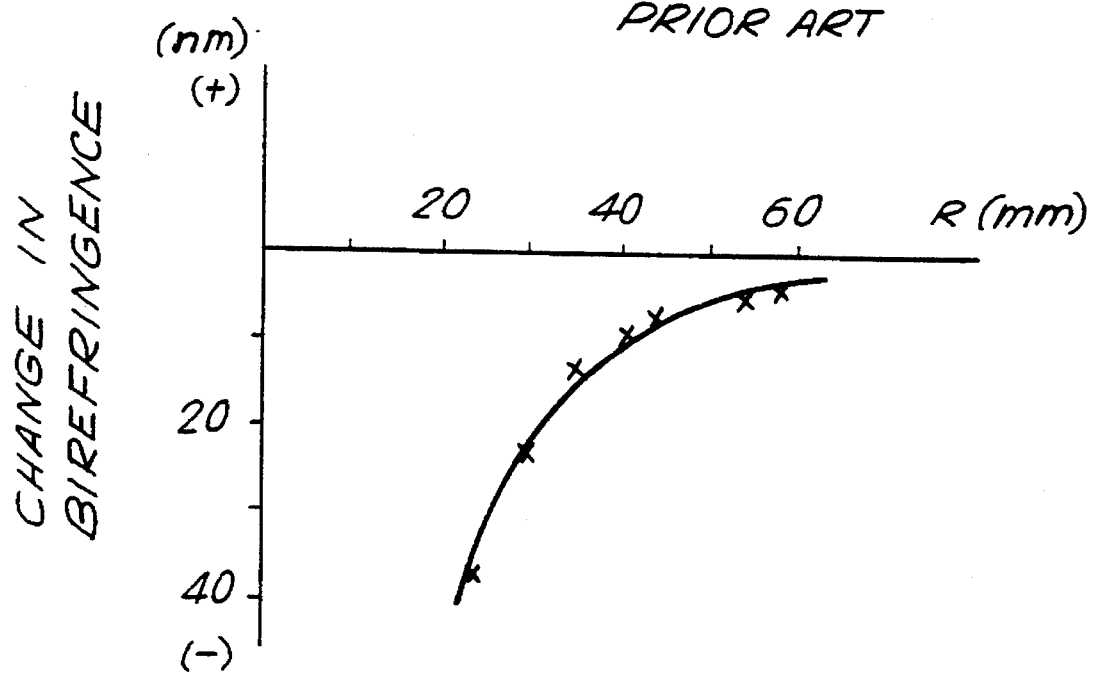
FIG. 12 is a graph showing how birefringence varies with increasing radius in a conventional information recording disk.
Figure 13:
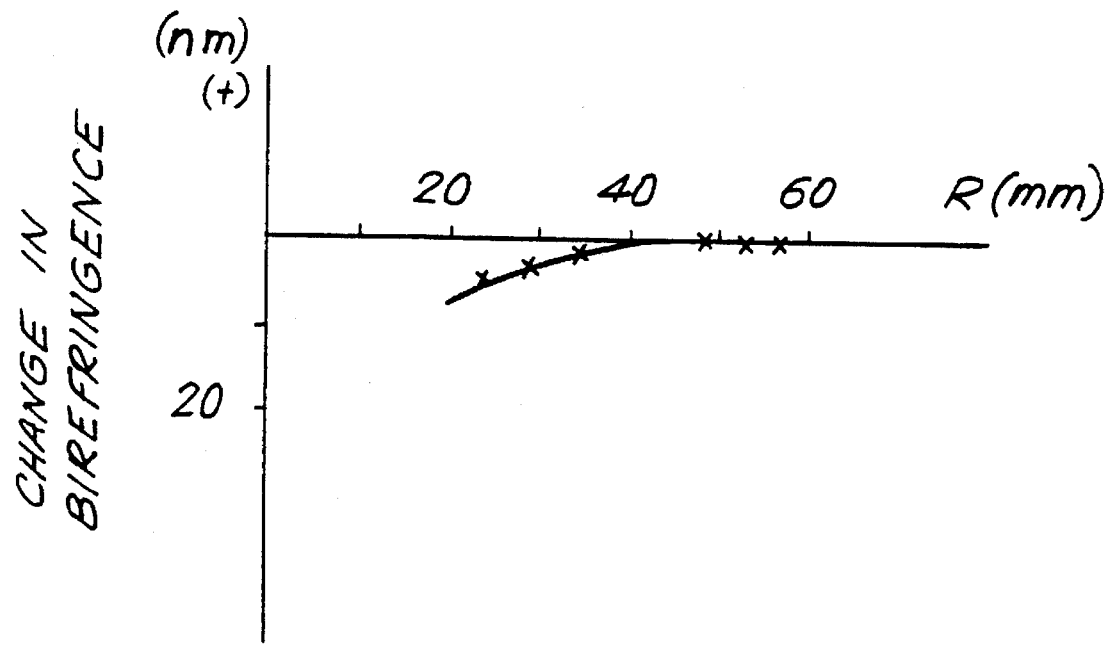
FIG. 13 is a graph showing how birefringence varies with increasing radius in an information recording disk constructed in accordance with the invention.

In addition to sufficiently securing hub 31 to disk 300, by mounting hub 31 in accordance with the invention, the change in the birefringence of the substrate close to the hub was much less than from conventional mounting arrangements. FIG. 13 is a graph showing the variation in birefringence with distance from the substrate center when a hub is welded to a substrate in accordance with the third embodiment of the invention. As shown in FIG. 13, the change in birefringence at a distance of 23 mm from the center was less than about 5 nm. This change in birefringence is negligible, especially when compared to FIG. 12, in which the change in birefringence of a conventional information reading disk at the same distance from the center of the substrate was about 40 nm. The same benefits are also achieved when the hub is bonded to the substrate with adhesive.

Information recording disks constructed in accordance with the invention avoid problems associated with heat generated during disk drive operation. A disk constructed in accordance with the invention was mounted on a disk drive and the heat transmitted from the drive motor to the disk through the hub was found to be too small to be measured. Accordingly, thermal effects of heat transmitted from the hub of an information recording disk constructed in accordance with the invention is negligible. Additionally, the same benefits are achieved when the hub is bonded with adhesive.

FIG. 5 is a perspective view showing that only a small portion of hub 31 projects upwardly from the surface of disk 300. Accordingly, disk 300 has a reduced overall thickness. Further, a disk drive constructed to receive information recording disk 300 does not require structures for handling a projecting hub when mounting the disk on the drive. Therefore, disk drives constructed to use information recording disks constructed in accordance with the invention can be simplified as well as made thinner.

Figure 6:
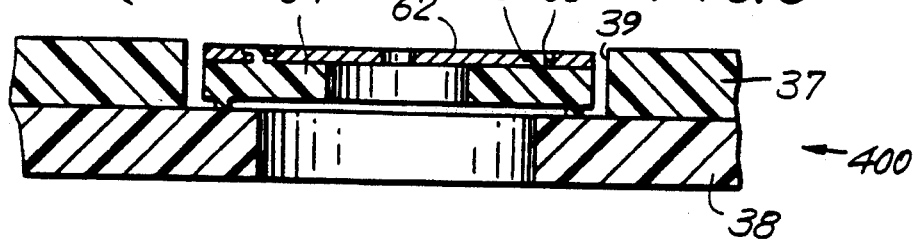
FIG. 6 is a partial sectional view of the hub structure in accordance with a fourth embodiment of the invention.

An information recording disk 400 constructed in accordance with a fourth embodiment of the invention is shown in sectional view in FIG. 6. Disk 400 is similar to information recording disk 300 except that hub 61 of disk 400 lacks a flange extending from the upper rim of the hub plate and hub 61 is thinner than about the thickness of first substrate 37. Otherwise, disk 400 is similar to disk 300. The same metals can be used to form hub metal plate 62 and the same materials can be used to form hub plate 64. However, in this embodiment hub metal plate 62 is joined to hub plate 64 by a plurality of inversely tapered or stepped holes 65 and 66 formed in the circumferential periphery of hub metal plate 62 by insertion formation or heat caulking.

Hub metal plate 62 is a flat plate adapted to contact ultrasonic horn 411 directly during ultrasonic welding. This is not disadvantageous. After hub 61 was welded to substrate 38 using the third embodiment of FIG. 4 the strength of the weld and the change in birefringence were about the same as in the third embodiment. However, information recording disk 400 has advantages over disk 300 in that hub 61 does not extend over the top surface of substrate 39. This arrangement more effectively reduces the overall thickness of the recording disk and the disk drive as well as simplifying the construction of the disk drive and achieving other advantages due to the lack of a raised hub portion.

Figure 7:
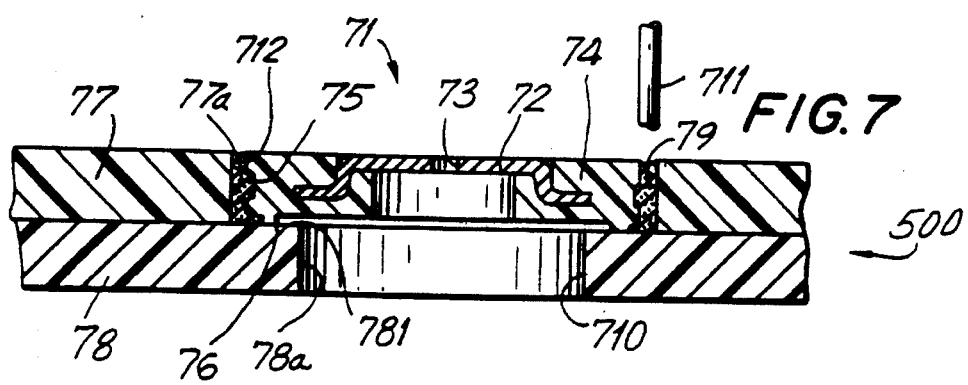
FIG. 7 is a partial sectional view of the hub structure in accordance with a fifth embodiment of the invention.

An information recording disk 500 constructed in accordance with a fifth embodiment of the invention is shown in sectional view in FIG. 7 Disk 500 includes a combination of a weld and adhesive to mount a hub 71 on information recording disk 500. Disk 500 is formed of a first substrate 77 having a central aperture 77a and a second substrate 78 having a smaller central aperture 78a. The inner apertures of substrate 77 and substrate 78 are concentrically aligned to form a stepped recess with a shoulder 781 and a first vertical wall 79 and a second vertical wall 710.

An information recording disk constructed as disk 500 is useful when an ultrasonic weld is insufficient to secure a hub to an information recording disk For example, if the materials selected or some other condition prevents a weld 76 between hub 71 and second substrate 78 from providing a sufficiently secure mounting of hub 71, an adhesive 712 can be charged from a dispenser 711 between hub 71 and second wall 79 to mount hub 71 securely.

Information recording disk 500 includes a hub metal plate 72 joined to a hub plate 74 as described in connection with the third embodiment. Hub plate 74 can be formed of a thermoplastic resin, such as polycarbonate or PMMA. Hub metal plate 72 can be formed of the same type of metal as described above. If substrate 78 is formed of a different material than described above, such as glass or an epoxy resin, weld 76 will be unable to mount hub 71 securely. Such a weld will not withstand high speed rotation at speeds of more than about 1800 rpm or external disturbances, such as mounting or dismounting from a disk drive or by being accidentally dropped.

When weld 76 is insufficient to mount hub 71 to disk 500, the following mounting procedure can be used First, the center grooves or pits formed in the information recording disk and a central hole 73 of hub metal plate 72 are aligned as in the procedure for mounting a hub. The alignment can be accomplished by use of an image detector such as a pick-up and the center position can be calculated with a computer. Use of a VMN-72PR ultrasonic welding machine produced by Cho-Ompa Kogyo K.K. is advantageous, because this single machine can concentrically align the hub and the substrates as well as weld the hub to the substrate.

After hub 71 is welded to shoulder 781, hub 71 is fixed temporarily to substrate 78. However, if pushed it is possible to detach hub 71. After hub 71 is temporarily welded to shoulder 781, adhesive 712 can be placed between first vertical wall 79 and hub 71. Adhesive does not flow into aperture 78a of substrate 78, because weld 76 effectively seals this region from the adhesive.

Any type of adhesive which will bond glass and resin is suitable for use. Because weld 76 acts as a seal, a low viscosity adhesive can be used. The wall of hub plate 74 opposing vertical wall 79 can be notched to form a groove 75 to increase the bonding strength between hub 71 and disk 500.

Mounting a hub in accordance with this embodiment achieves the advantages and qualities of the third and fourth embodiments. In fact, this embodiment further increases the strength of the bond of the hub to the recording disk. Further, the adhesive can be charged in a simple manner from above the hub so that a single machine can center, temporarily fix and then permanently fix the hub to the recording disk without unduly complicated machinery. This can increase production while reducing costs.

Figure 8:
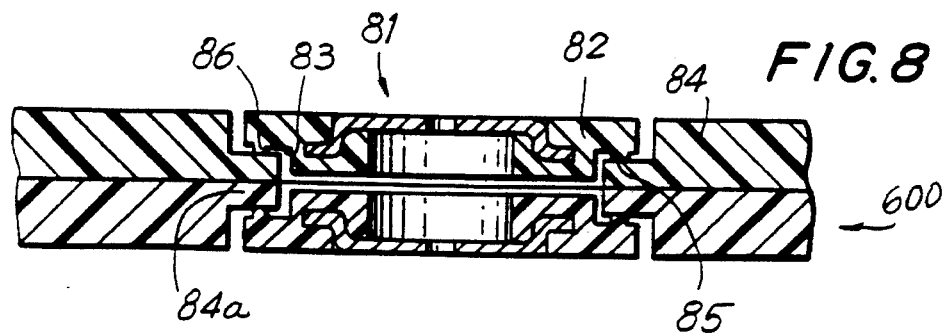
FIG. 8 is a partial sectional view of the hub structure in accordance with a sixth embodiment of the invention.

An information recording disk 600, constructed in accordance with a sixth embodiment of the invention is shown in sectional view in FIG. 8. Disk 600 is formed from two similar substrates 84, each having a stepped central aperture formed by an inwardly projecting flange 84a with a shoulder 85. A pair of hubs 81 are formed with a hub plate 82 which has a stepped lower surface 83, adapted to nest in the stepped recess formed by shoulder 85. A welding ring 86 formed on stepped lower surface 83 is included to weld hub 81 to substrate 84. Information recording disk 600 has reduced thickness and other advantages of recording disks constructed in accordance with the invention.

Although information recording disk 600 is a double sided disk, disk 600 can be modified to be a single sided disk and have a single recording substrate. Further, the hub can be formed of metal and can be designed to be fixed to the disk substrate with an adhesive.

Figure 9:
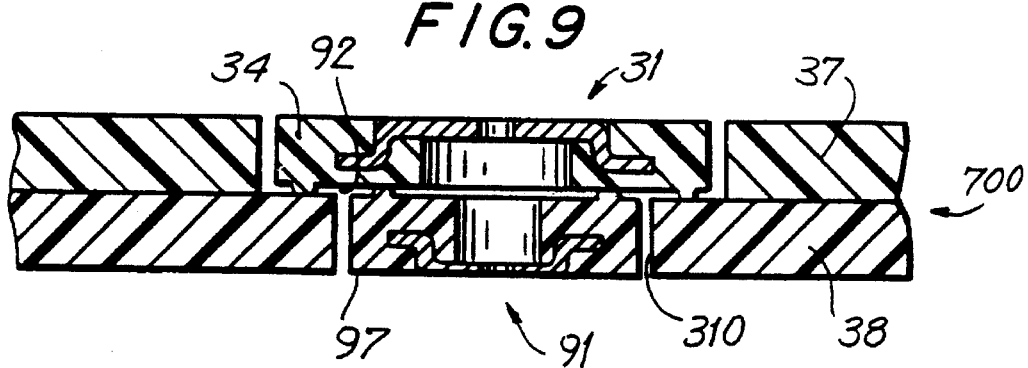
FIG. 9 is a partial sectional view of the hub structure in accordance with a seventh embodiment of the invention.
Figure 10:
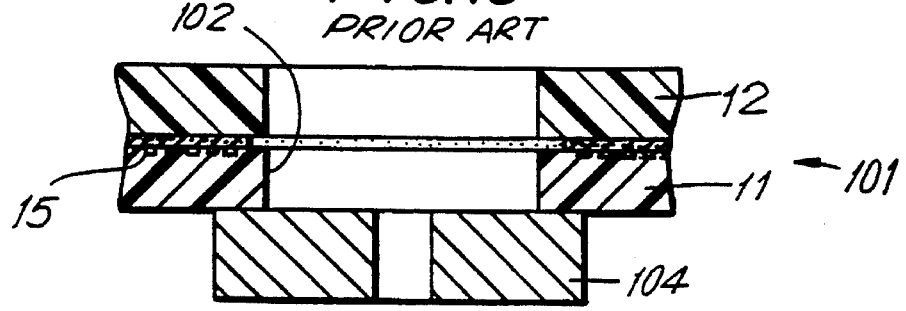
FIG. 10 is a partial sectional view of a hub structure of a conventional information recording disk.
Figure 11:
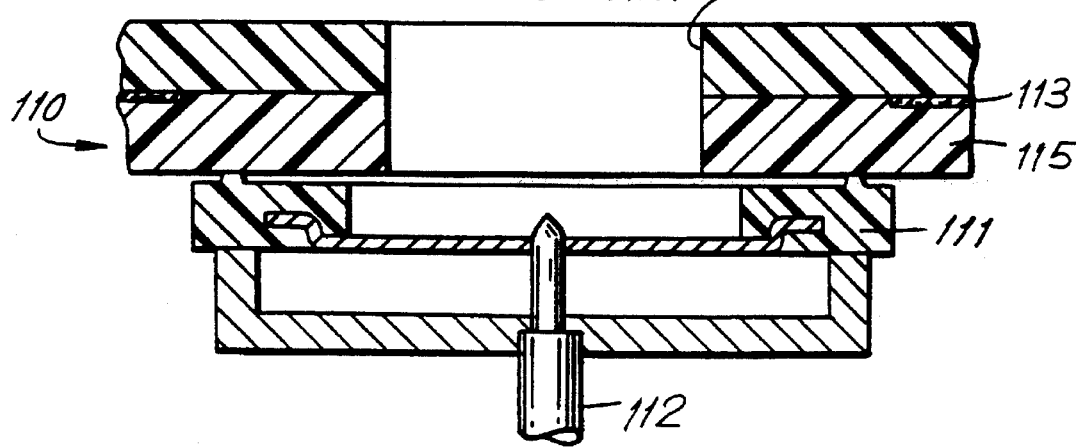
FIG. 11 is a partial sectional view of a hub structure of a conventional information recording disk mounted on a spindle of a disk drive.

FIG. 9 illustrates an information recording disk 700 constructed in accordance with a seventh embodiment of the invention. A hub 31, similar to the hub of the third embodiment is mounted on substrate 38 as in the third embodiment. Central aperture 38a of substrate 38 has inner wall 310 and a secondary hub 91 having an outer diameter which is smaller than the inner diameter defined by wall 310 is mounted to an inner surface 92 of hub 31. Guide grooves formed in substrate 38 are used to position secondary hub 91 properly. Because secondary hub 91 is thinner than the thickness of substrate 38 the addition of secondary hub 91 does not increase the overall thickness of the resulting information recording disk.

As described above, in accordance with the invention, information recording disks are formed having a smaller hub and thinner size. Because the hubs are attached to a region of the information recording disk which is located away from the recording portion of the disk, adverse influence due to fixing the hub on the recording properties of the disk is reduced. In particular, the variation of birefringence is reduced to a negligible level and the effects of heat transmitted from the hub on the information recording layer are reduced.

Furthermore, because either a portion of or the entire hub is concealed within a recess formed at the center of the disk substrate, the total thickness of the disk is reduced and the disk design is improved. Disk drives constructed for utilizing disks formed in accordance with the invention do not need structures which are designed for coping with projecting hubs. Therefore, these disk drives can be simplified and their thickness can be reduced. Disks can have an overall thickness of less than about 4 mm and even less than about 3.5 mm. In fact, when the hub or hubs are fully concealed within the center recess, a thickness equal to about the thickness of the disk substrates can be achieved.

Although the advantages and effects of the invention are greatest when disk substrates are formed of resin, the invention is not limited to such substrates. The substrates can be formed of optically stable glass, a polystyrene-polycarbonate composite or an acrylic material. Disks formed from these substances benefit from the reduction in overall thickness.

In addition, the information recording disk can be formed from two substrates, one having a hole for receiving at least a portion of the hub and the other having no center hole. For example, the substrate can formed with a glass material which lacks a small diameter hole. Further, ceramic material such as $Al_2O_3$ or $Ta_2O_5$ which are not optically transparent and metals such as aluminum or titanium can be used to form portions of the disk substrate which are remote from where optical reading and recording will be performed by an optical head.

It will thus be seen that the objects set forth above, among those made apparent from the preceding description, are efficiently attained and since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An information recording disk for inserting in a disk drive, comprising:
   a substrate including an information recording layer and having a first and a second outside surface and a stepped recess formed therein with a first wall defining a large diameter opening and a second wall defining a smaller diameter opening and an inwardly projecting shoulder from the wall defining the large opening to the wall defining the smaller opening, the large diameter opening located at the first outside surface;
   a hub including magnetically attractable material disposed in the recess, the hub mounted to the shoulder and having a diameter smaller than the diameter of the large diameter opening and larger than the diameter of the smaller diameter opening and positioned so that it does not contact the first wall for forming a gap therebetween; and
   the hub being sufficiently thin so that when disposed in the recess, it does not extend beyond the thickness of the substrate.

2. The information recording disk of claim 1, wherein the hub thickness is such that it is positioned entirely between the shoulder and the first surface of the disk within the recess defined by the shoulder and the large opening.

3. The information recording disk of claim 1, wherein the hub is fixed to the substrate by at least one of a weld and an adhesive.

4. The information recording disk of claim 1, wherein the hub includes a metal plate formed of magnetic material selected from the group consisting of rust treated iron-based material, nickel plated iron-based material, chromium plated iron-based material and magnetic stainless steel.

5. The information recording disk of claim 4, wherein the metal plate has Vickers hardness (Hv) of more than about 200.

6. The information recording disk of claim 4, wherein the overall thickness of the information recording disk is about 3.4 to 4 mm.

7. The information recording disk of claim 4, wherein the metal plate extends beyond the diameter of the smaller diameter opening.

8. The information recording disk of claim 1, wherein the hub includes a polymer resin body and a metal plate.

9. The information recording disk of claim 1, wherein the overall thickness of the information recording disk is about 3.4 to 4 mm.

10. The information recording disk of claim 1, wherein the smaller diameter opening is at the second outside surface.

11. The information recording disk of claim 1, wherein the substrate is formed of a material selected from the group consisting of glass, resin material and ceramic material.

12. The information recording disk of claim 11, wherein the substrate is formed of a single material.

13. The information recording disk of claim 1, wherein the hub is not in direct contact with the second wall.

14. The information recording disk of claim 1, wherein the plane of the first outside surface is substantially parallel to the plane of the shoulder.

15. An information recording disk for inserting in a disk drive, comprising:
   substrate means including an information recording layer and having a first outside surface and a second outside surface, the substrate means having a stepped recess formed therein with a first wall defining a large diameter opening and a second wall defining a smaller diameter opening and a shoulder projecting inwardly from the wall defining the large diameter opening to the wall defining the smaller diameter opening, the large diameter opening located at the first outside surface; and
   hub means including magnetically attractable material disposed in the recess for holding the disk to a disk drive, the hub means having a diameter smaller than the diameter of the large diameter opening and larger than the diameter of the smaller diameter opening so that it does not contact the first wall and the hub means being sufficiently thin so that it does not extend beyond the first or second outside surface of the substrate.

16. The information recording disk of claim 15, wherein the hub means thickness is such that it is positioned entirely between the shoulder and the first surface of the disk within the recess defined by the shoulder and the large opening.

17. The information recording disk of claim 15, wherein the hub means is fixed to the substrate by at least one of a weld and an adhesive.

18. The information recording disk of claim 15, wherein the hub means includes a metal plate formed of magnetic material selected from the group consisting of rust treated iron-based material, nickel plated iron-based material, chromium plated iron-based material and magnetic stainless steel.

19. The information recording disk of claim 18, wherein the metal plate has Vickers hardness (Hv) of more than about 200.

20. The information recording disk of claim 18, wherein the metal plate extends beyond the diameter of the smaller diameter opening.

21. The information recording disk of claim 15, wherein the hub means includes a polymer resin body and a metal plate.

22. The information recording disk of claim 15, wherein the overall thickness of the information recording disk is about 3.4 to 4 mm.

23. The information recording disk of claim 15, wherein the smaller diameter opening is at the second outside surface.

24. The information recording disk of claim 15, wherein the substrate means is formed of a material selected from the group consisting of glass, resin material and ceramic material.

25. The information recording disk of claim 15, wherein the hub is not in direct contact with the second wall.

26. The information recording disk of claim 15, wherein the plane of the first outside surface is substantially parallel to the plane of the shoulder.

* * * * *